INVENTOR
FREDERICK C. BESLER
BY
ATTORNEY

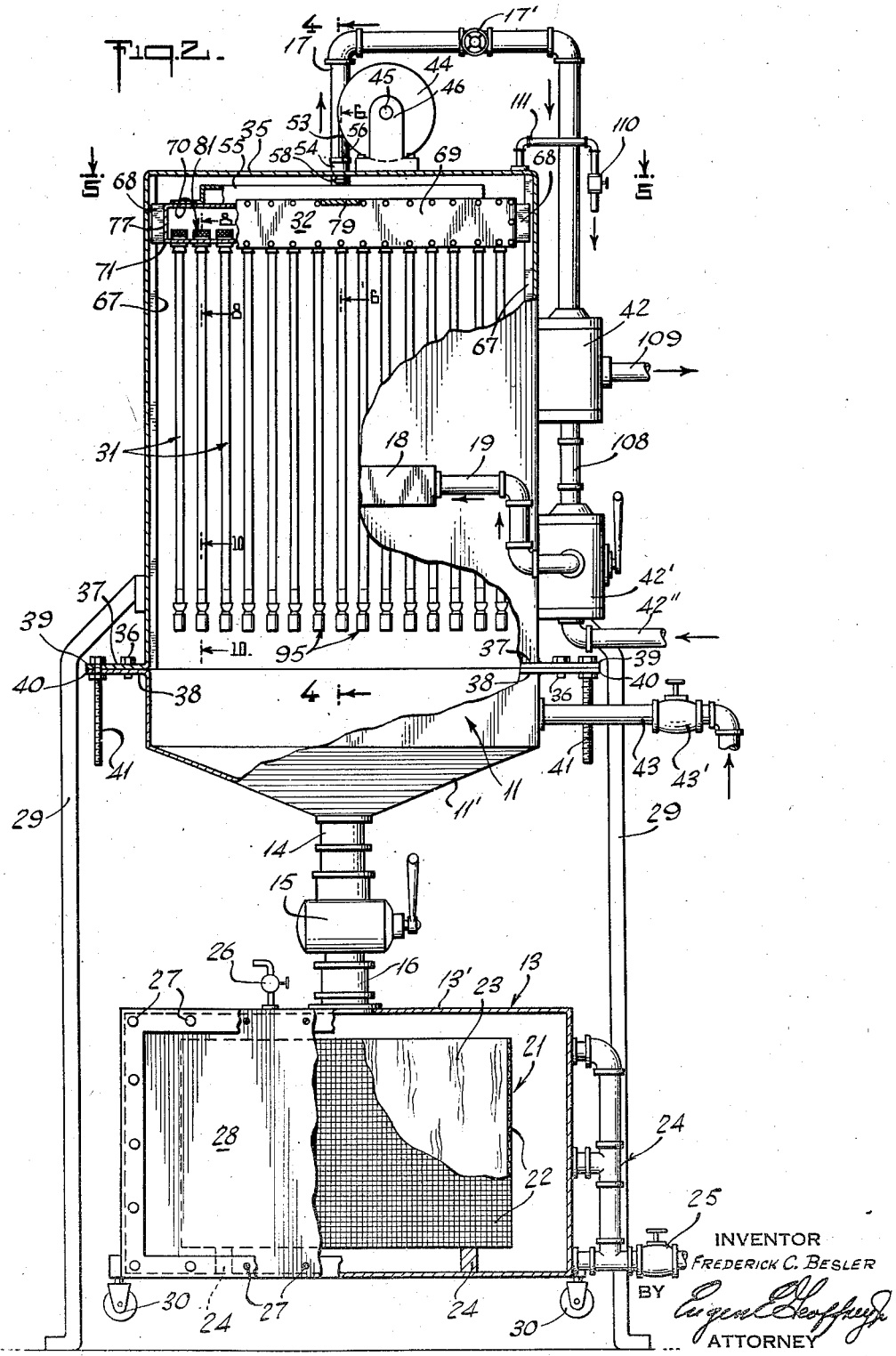

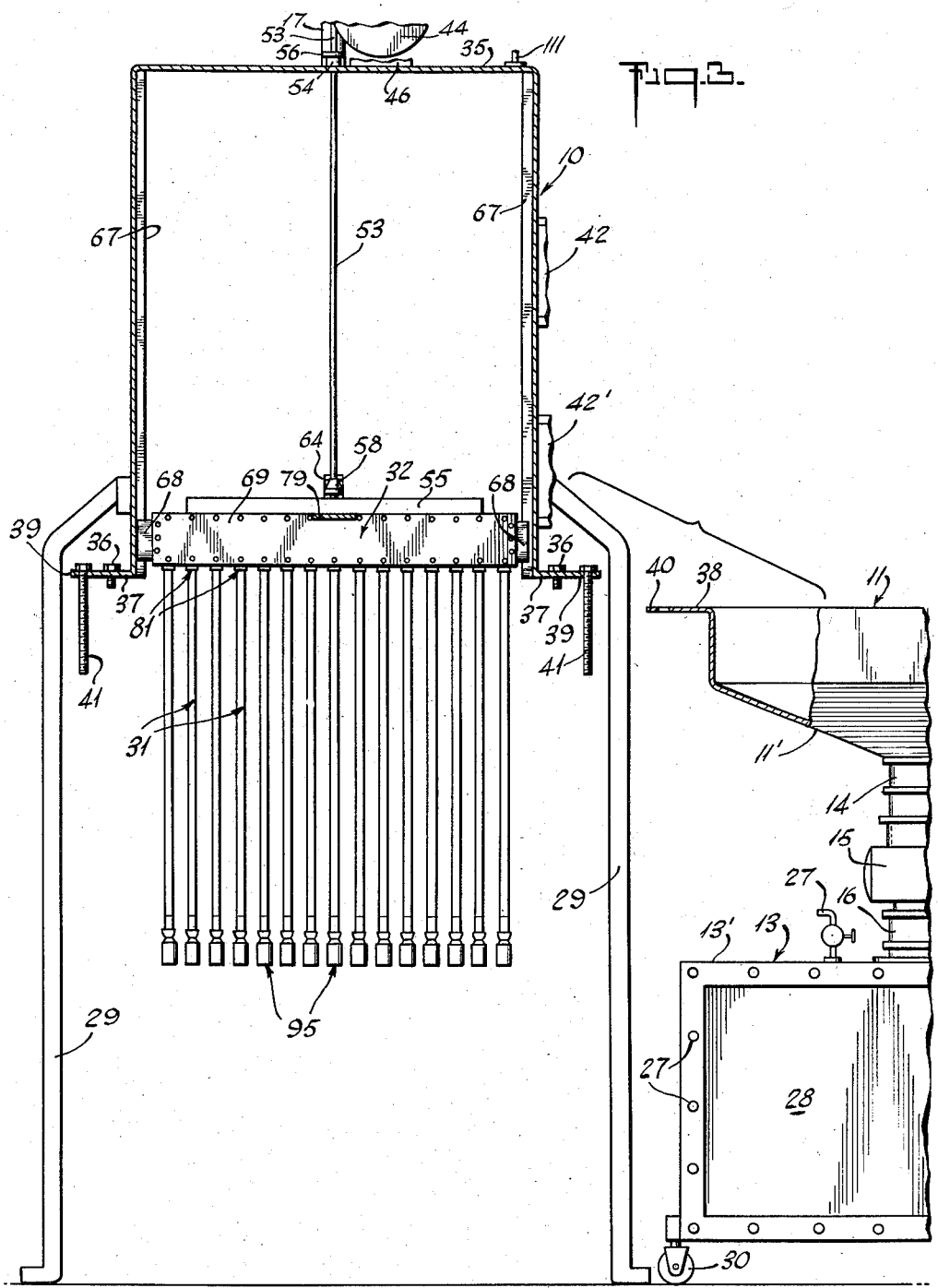

Oct. 20, 1959     F. C. BESLER     2,909,285
FILTER
Filed March 29, 1956     5 Sheets-Sheet 4
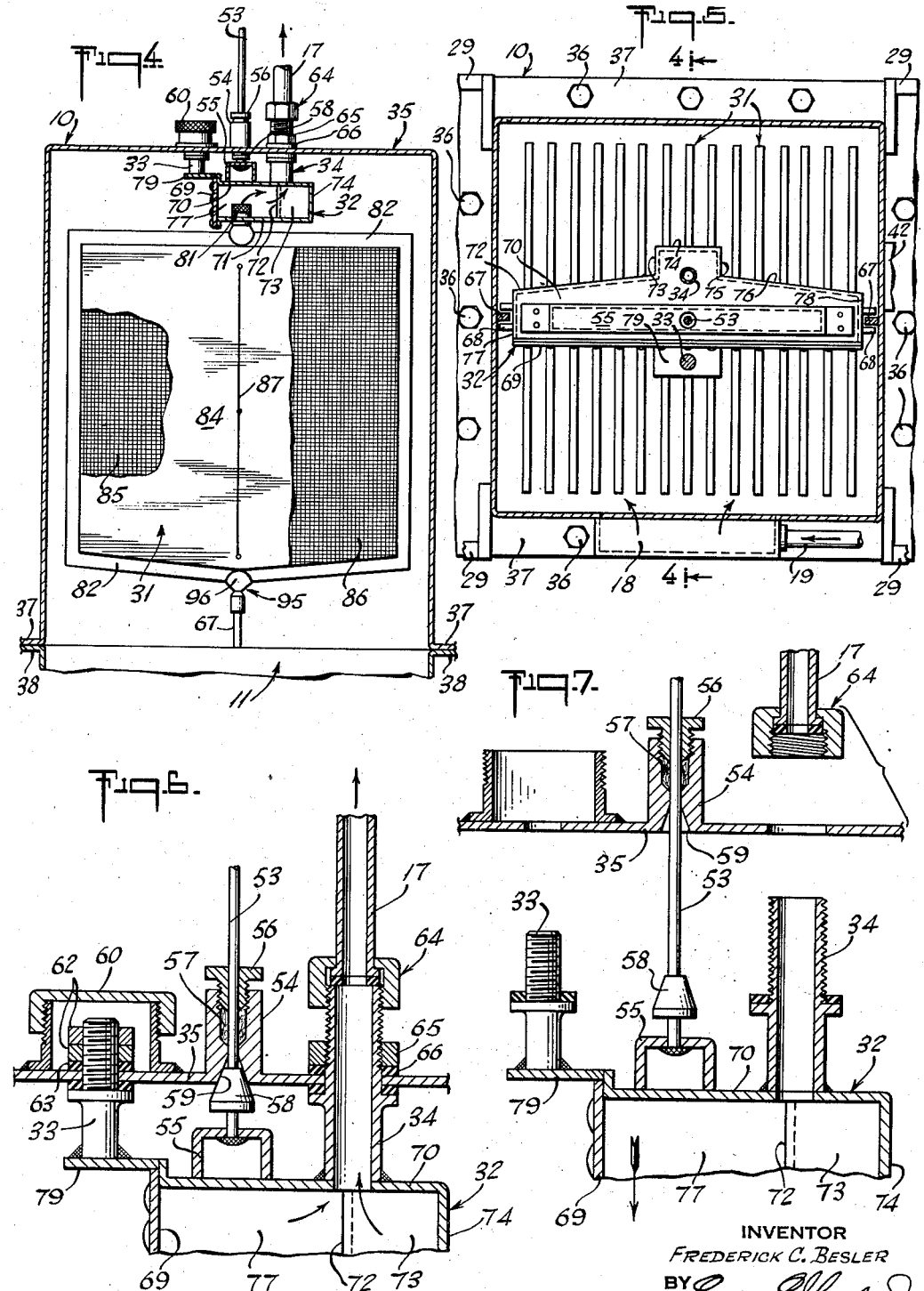
INVENTOR
FREDERICK C. BESLER
BY
ATTORNEY

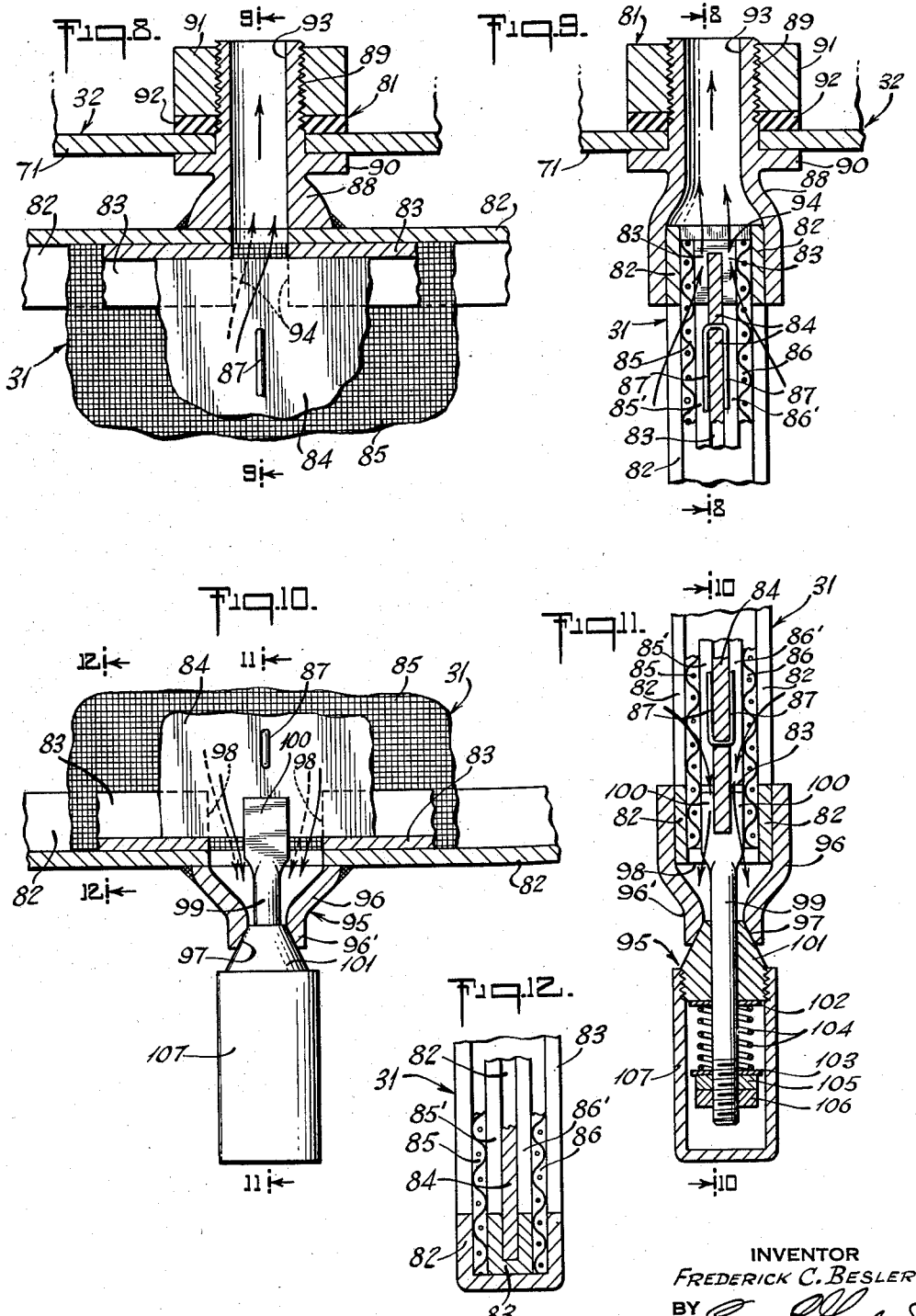

United States Patent Office 2,909,285
Patented Oct. 20, 1959

2,909,285

FILTER

Frederick C. Besler, Ossining, N.Y.

Application March 29, 1956, Serial No. 574,810

2 Claims. (Cl. 210—232)

This invention relates to filter systems and more specifically to a new and improved fluid filter and method of operation particularly useful in connection with closed systems to facilitate cleaning of the filter elements and removal of sludge with minimum interruption of the filtering process.

Prior known filters for industrial purposes and particularly filters designed for handling large quantities of liquids or chemicals have not been found to be entirely satisfactory for a number of reasons as for example complexity of construction and the difficulty of maintenance and repair. This was particularly the case with filters employed in closed systems for filtering highly volatile liquids. While some filters have utilized means for reversing the flow of the liquid being filtered in order to remove sludge from the surfaces of the filtering elements contained within an outer sealed vessel actual removal of the sludge thus collected in the vessel necessitated complete interruption of the filtration process and draining of the vessel so that the sludge could be removed by scraping or shoveling it from the bottom of the vessel. For this purpose suitable doors or cover plates had to be provided for sludge removal and care taken to insure that the door or plate was properly sealed to the container after removal of the sludge and before reestablishing the filtering process.

Another disadvantage of prior filters of this type resides in the need for a top opening for removal and repair of the filters. With known devices substantial head room must be provided in order to permit removal of the top and lifting of the filters from their place within the outer vessel. Furthermore, in many of the filters the filter elements must be removed individually from the top of the housing or outer vessel for thorough cleaning and even in cases where they may be removed simultaneously they must be lifted from the vessel manually or by costly auxiliary cranes or other lifting equipment. These cleaning procedures take considerable time and in many instances auxiliary filtering devices are necessary in order to avoid extended and relatively frequent interruptions of the associated processes. Furthermore, in known filtering devices for highly volatile liquids such as carbon tetrachloride, perchlorethylene and the like used in dry cleaning operations, a considerable amount of the fluid is lost during the sludge removal operation and cannot be reclaimed. As these liquids are relatively expensive, their loss constitutes a substantial increase in cost of many present filtering operations.

The above and other disadvantages of prior filters are overcome by this invention which provides a highly efficient and effective filter for the removal of sludge with little or no interruption in the filtering process and at the same time enables the reclamation of substantially all of the liquid that may have been discharged with the sludge.

Another object of the invention resides in the provision of an improved filter characterized by its ease of operation and maintenance, provision for rapid removal of the sludge and means for rapidly removing all of the filter elements from the filter vessel for thorough cleaning and replacement if necessary.

Still another object of the invention resides in the provision of a new and improved liquid filter useful in both open and closed filtering systems that affords ready access to the filtering elements for cleaning, replacement or repair and that does not require head room in addition to that needed for accommodation of the filter structure itself.

A still further object of the invention resides in the provision of a new and improved filter element and associated manifold for holding a plurality of such elements that are characterized by their simplicity, relatively low cost and durability. By reason of the improved structure of the filter elements themselves more effective and dependable filtering is obtained and at the same time improved filter element protective means are provided to facilitate removal of sludge collected on the outer surfaces thereof without risking damage to the filter elements themselves.

A still further object of the invention resides in the provision of a relatively compact liquid filter embodying self-contained means for quickly and easily removing sludge filtered from the liquid without interrupting the filtering process and at the same time provide means for cleaning the filtering elements by reversing the flow of the liquid being filtered or by complete removal of the filter elements for a more thorough cleansing.

A further object of the invention resides in the provision of a new and improved method for filtering liquids that will greatly minimize interruption of the filtering process for sludge removal and cleaning of the filter elements.

The above and other objects and advantages of the invention will become more apparent from the following description and accompanying drawings forming part of this application.

In the drawings:

Fig. 2 is a side elevation in partial section of the filter shown in Fig. 1;

Fig. 3 is a side elevation in partial section of the filter shown in Fig. 2 with the bottom portion removed and the filtering elements in the lowered position for cleaning or replacement;

Fig. 4 is a partial cross sectional view of the filter shown in Fig. 2 and taken along the line 4—4 thereof;

Fig. 5 is a cross sectional view of Fig. 2 taken along the line 5—5 thereof;

Fig. 6 is an enlarged cross sectional view taken along the line 6—6 of Fig. 2 illustrating the attachment of the manifold and filter elements to the upper wall of the filter vessel;

Fig. 7 is a cross sectional view similar to Fig. 6 with the manifold and filter elements disconnected from the upper wall of the filter and in a partially lowered position;

Fig. 8 is a fragmentary cross sectional view of a filter element taken along the line 8—8 of Figs. 2 and 9;

Fig. 9 is a cross sectional view taken along the line 9—9 of Fig. 8;

Figure 1:
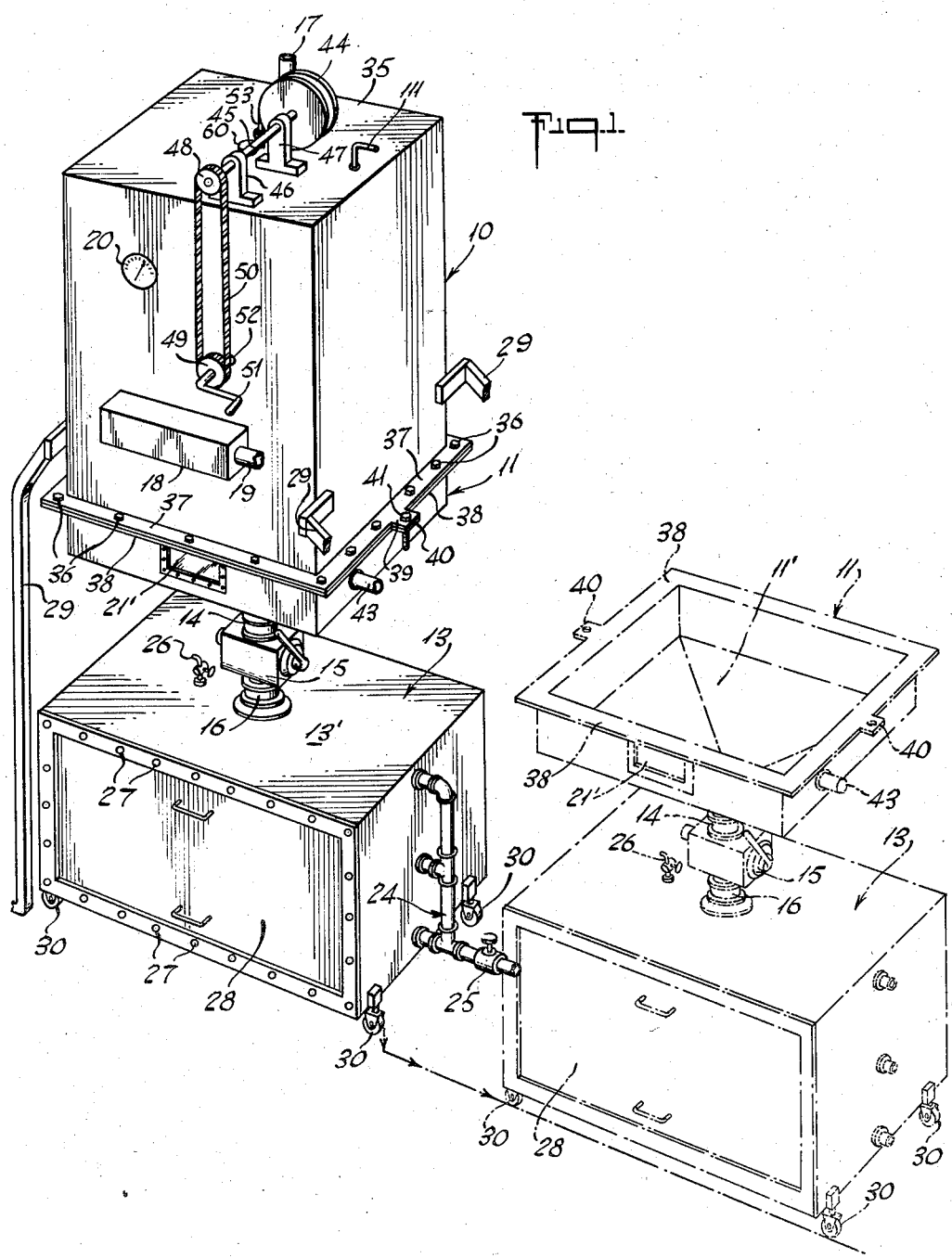
Fig. 1 is a perspective view of a filter in accordance with the invention and illustrates in phantom the removal of the lower portion of the filter for exposing and cleaning the filtering elements.

Fig. 10 is a partial cross sectional view of the lower portion of the filter element taken along the line 10—10 of Fig. 2 to illustrate the pressure relief valve; and Figs. 11 and 12 are cross sectional views of Fig. 10 taken along the lines 11—11 and 12—12, respectively.

The filtering apparatus now to be described is generally applicable to the filtration of all types of fluids including petroleum and synthetic solvents, viscous oils, chemicals, water and the like and may be arranged to filter fluids in any desired quantities and to meet the needs of a particular application. An important advantage of the invention is particularly evident when utilized in connection with the filtration of highly volatile chemicals employed in dry cleaning plants and establishments. These chemicals are relatively expensive and a filter in accordance with the invention, when used in a closed circuit process, can be periodically cleaned to remove sludge from the filter elements and without exposing the cleaning fluid to the atmosphere. Moreover, the invention further includes means for extracting the liquid from the sludge prior to exposure of the sludge to the air and in this way reduces fluid losses due to filtration to a minimum.

More specifically and with reference to Figs. 1 through 3 of the drawings illustrating a liquid filter, the filter includes an upper housing or vessel 10, a lower closure member 11 for the vessel 10, and a closed receptacle 13 for receiving and drying the sludge removed from the liquid during the filtration process. The lower closure member 11 for the filter housing 10 has an inverted pyramidal or conical bottom portion 11' to receive the sludge and guide it toward a central exit conduit 14 fixedly secured centrally of the bottom member 11. The exit conduit 14 is in turn secured to the top 13' of the closed vessel 13 by means of a rapid operating valve 15 and a connecting conduit 16.

The novel and improved filter elements constituting part of the invention will be described in detail as the description proceeds. These filters are contained within the filter housing 10 and connected with the fluid outlet 17 extending from the top of the vessel 10. The inlet to the filter is in the form of a manifold 18 and inlet conduit 19 disposed on the side of the vessel 10. The inlet 19 and the outlet 17 may be connected to the associated system in any desired manner with the system providing the necessary pressure to force the fluid through the filter. If desired a pressure gauge 20 may be installed on the side of the vessel 10 in order to avoid subjection of the filter to excessive pressures.

As the liquid is constantly filtered, particles and other impurities removed from the liquid collect on the filter surfaces while a small portion settles to the bottom of closure member 11. The collection of sludge on the filters requires gradually increased pressures to force the liquid through the filter elements. After the pressure reaches a predetermined value, the liquid flow is reversed or compressed air, super heated steam or the like is forced through the filter elements to dislodge the sludge. As the dislodged sludge collects within the bottom member 11, it will become visible through a window 21' in the side of the member 11 and upon the accumulation of a predetermined quantity of sludge it is discharged into the lower container 13. This may be accomplished merely by opening the valve 15 to permit the pressure within the vessel 10 to force the sludge outwardly through the connecting conduits 14 and 16 and into the container 13 whereupon the valve is closed. It will be observed that this operation may be conducted without interfering in any way with the filtering process with the exception of effecting a slight reduction in pressure within the vessel 10 by reason of the relatively rapid removal of the collected sludge. In the alternative, inlet and outlet valves connecting the filter to the liquid system may be closed and valve 15 together with the upper vent 111 opened to allow the weight of the liquid to force the sludge into the receptacle 13.

Under the condition where sludge is removed by closing the inlet and outlet valves, after the sludge has been discharged, the valve 15 is closed and liquid is admitted to the filter with the vent 111 at least partially open until the vessel is completely filled. In many cases extremely fine filtration is required and this is attained by coating the filter screens with a diatomaceous earth or equivalent material. This is accomplished by adding earth to a quantity of liquid being filtered and then continuously circulating it through the filter until the earth has been deposited on the screens. The complete deposition of the earth on the filter elements can be determined by means of sight glasses in the liquid input and output conduits. The filter is then ready for normal operation. When sludge is removed as described above, the diatomaceous earth often falls from the surface of the screens and it must be replaced as described above before the filtering process can be continued.

In order to facilitate reclamation of the liquid from the sludge deposited within the container or receptacle 13, the receptacle 13 is provided with a porous container 21 shown in Fig. 2 of the drawings. This container is preferably in the form of a heavy wire receptacle 22 having a lining 23 of cloth or other similar material. The container 21 is held in a raised position within the receptacle 13 by supporting members 24 so that the liquid will readily drain from the sludge. The drained liquid is then removed through the outlet assembly 24 controlled by valve 25 and air may be admitted through the vent cock 26 on the top of the receptacle 13 to speed up the draining process. The container 21 is then removed from the receptacle 13 by removing the bolts 27 from the front closure member 28 to open the receptacle 13. The container 21 holding the drained sludge is then replaced by a fresh container 21 and the front cover member 28 is again secured in place so that the receptacle 13 is ready for receiving another sludge deposit.

The entire filter unit including the elements 10, 11 and 13 is supported by four legs 29, two of the legs having been broken away in Fig. 1 in order to clarify the illustration. It will be observed that in the normal operating position of the several elements that the receptacle 13 which includes four casters 30 is held in a raised position with the casters 30 perferably one or two inches from the floor as may be observed in Figs. 1 and 2. With this arrangement the weight of the containers 13 is supported wholly by the conduits 14 and 16 and the intervening valve 15. If desired, however, additional supporting members may be fastened between the lower closure member 11 of the filter receptacle 10 and the sludge receptacle 13 in order to relieve mechanical stresses and strains on the valve 15 and associated conduits.

The improved filter elements in the illustrated embodiment of the invention include a plurality of rectangular filters 31 placed in parallel relationship as illustrated in Fig. 2. The filter elements which will be described in detail are secured to and depend from a common manifold 32 which communicates with the outlet pipe 17. The filter elements 31 and the associated manifold 32 are held in position within the filter vessel 10 by a threaded stud 33 (see Fig. 4) and a tubular threaded stud 34 that are secured to the upper wall 35 of the vessel 10.

In normal filtering processes it is often desirable to remove the filter elements 31 periodically for a more thorough cleaning and this invention provides novel and improved means for the attainment of this end quickly and easily and without the need for auxiliary equipment or head room above the filter itself. More specifically removal of the filter elements 31 is accomplished by first removing the closure member 11 from the bottom of the vessel 10. It will be observed that the member 11 is secured to the vessel 10 by a plurality of bolts 36 extending through peripheral flanges 37 and 38 on the members 10 and 11, respectively. In addition each of the members 10 and 11 include a pair of oppositely disposed outwardly flanged parts 39 and 40 through which elongated bolts 41 extend. Before the closure member 11 can be removed from the filter it is of course necessary to drain the liquid from the filter. This may be accomplished by closing the inlet and outlet conduits 19 and 17, respectively, by suitable valves, such as, valves 42 and 42' shown in Fig. 2 of the drawings. These valves may also be used for periodically reversing the flow of liquid through the filter in order to remove sludge that may cling to the filter surfaces and thus avoid frequent removal of the filter elements themselves. When the valves 42 and 42' are closed the residual liquid within the vessel 10 may be drained off by opening the outlet 43 communicating with the closure member 11 and the upper vent 111 controlled by valve 110. The outlet 43 may also be used for testing the filter to see that it is properly sealed during the reassembly process.

With the liquid completely drained from the filter, the bolts 36 are removed so that the entire weight of the lower closure member 11 and the receptacle 13 is supported by the bolts 41. These bolts 41 act as jacks or lifts and permit gradual lowering of the receptacle until it rests on the floor. The bolts 41 are then completely removed and the lower assembly including the closure member 11 and the receptacle 13 may be wheeled on casters 30 from beneath the filter vessel 10 as shown in Fig. 1.

Removal of the filter element assembly including the elements 31 and the manifold 32 is accomplished by a hoist fixedly mounted to the vessel 10 and including a cable wheel or winch 44 carried by a shaft 45 journaled in bearings 46 and 47. The outer end of the shaft carries a small sprocket 48 coupled to a lower sprocket 49 by means of a chain 50. The lower sprocket is provided with a hand crank 51 and this crank together with the sprocket 49 are journaled to the filter vessel 10 at 52. In addition suitable locking means may be provided to hold the hoist in any desired position.

Referring now to Figs. 6 and 7 of the drawings it will be observed that the cable 53 wound about the cable wheel 44 extends downwardly through a tubular member 54 secured to the top wall 35 of the vessel 10 and is fastened to a bracket member 55 welded or otherwise fastened to the top of the manifold 32. The cable 53 is sealed in the tubular member 54 by an annular plug 56 threaded into the outer end of the boss 54 and packing material 57 compressed within the opening in the boss by the insertion and tightening of the plug 56. In addition the cable is provided with a conical member 58 of resilient material that nests into a cooperating conical portion 59 on the inner end of the tubular member 54 in order to more effectively seal the opening when the manifold and filter are in the operative position as shown in Fig. 6.

To lower the filter and manifold assembly the cap 60 enclosing the outer end of the stud 33 is removed and the nuts 62 and gasket 63 are removed from the stud 33. The union 64 coupling the outlet pipe 17 to the tubular outlet member 34 is disconnected and the nut 65 and gasket 66 is removed so that the entire weight of the filter and manifold assembly is supported by the cable 53. The entire assembly may now be lowered by turning the hand crank 51 counter clockwise as shown in Fig. 1 until the entire assembly extends from the bottom of the vessel 10. In order to guide the assembly downwardly during this operation a pair of tracks 67 are secured to the side walls of the vessel 10 and the ends of the manifold are provided with guides 68 for cooperation with the tracks. This maintains the assembly in a centered position as it is lowered by the cable 53.

In the usual case cleaning of the filters 31 is accomplished by immersing the entire filter in a caustic bath. With this invention this may be readily accomplished by placing the caustic bath immediately below the vessel 10 and then lowering the filters directly into the bath. After they have been cleaned they can be raised to permit removal of the bath and then lowered again for purposes of rinsing and drying and otherwise preparing the filters for subsequent filtering processes. After the filters have been properly cleaned and treated they are lifted into place and secured as shown in Fig. 6. The actual lowering operation of the filter and manifold assembly after removal of the securing means as described in connection with Fig. 6 is shown in Fig. 7. It will be observed that the entire assembly is supported wholly by the central cable 53.

The invention thus far described is useful with any type of filter element 31 and associated manifold 32 though it is preferred to use the thin rectangular filter elements as illustrated and which will be described in connection with Figs. 4, 5 and 8 through 12. While all of the elements are simultaneously removable for purposes of cleaning, the elements 31 are individually removable from the manifold 32 so that damaged or worn elements may be quickly and easily replaced. In the normal cleaning processes the filter elements 31 need not be lowered beyond the point shown in Fig. 3 of the drawings. If it is desired to remove one or more elements of the manifold, the manifold must be lowered beyond the point shown in Fig. 2 to facilitate removal of the manifold cover plate 69 in order to gain access to the filter attaching means.

In the illustrated embodiment of the invention the filter chamber 10 is of rectangular construction though it is apparent that it can be provided with any desired configuration. The manifold 32 may also be of any desired configuration though in the illustrated embodiment it is in the form of an elongated hollow structure of generally rectangular section. It is provided with a top plate 70, a bottom plate 71, a back side wall including the elements 72 through 76, inclusive, and end walls 77 and 78. These elements are preferably welded together to form a substantially unitary structure with the end walls 77 and 78 carrying the side guides 68 as illustrated more clearly in Fig. 5. The manifold is closed by the removable front plate 69 previously described.

In order to provide dual supporting means for the manifold and filter assembly as previously described, the manifold includes a short extension formed by the walls 73, 74 and 75 to accommodate the outlet conduit 34 at a point spaced from the center of the manifold. This conduit is preferably welded to the top plate 70 as shown in Fig. 5 and communicates with the chamber within the manifold. The stud 33 may be welded or otherwise secured to a plate 79 extending from and secured to the top wall 70 and preferably spaced from the center of the manifold a distance equal to the spacing between the center of the manifold and the outlet tube 34. The manifold further includes a series of openings in the bottom plate 71 to receive and accommodate tubular supporting members generally denoted by the numeral 81 for holding the filters 31 in position on the manifold and in communication with the chamber therein. This structure may be observed more clearly in Figs. 2 and 8.

Referring now to Figs. 4, 5, 8, 9 and 11 the individual filter elements 31 are of generally rectangular configuration bounded by a surrounding channel member 82. The filter structure is formed on an inner channel member 83 of substantially the same dimensions as the outer channel member 82 and supports a central and preferably solid metal sheet 84 with the channel 83 forming in effect a frame to support the plate or sheet and hold it in substantially rigid position. The filter screens 85 and 86 of metal, plastic, fabric or the like are fastened to the outer surfaces of the channel 83 and may be welded, soldered, or otherwise suitably fastened in sealed relationship thereto. The filters 85 and 86 are spaced from the plate or sheet 84 so that liquid surrounding the screens 85 and 86 will flow through the screens and then upwardly between the screens and the plate 84 for discharge. In order to maintain the spacing between the screens 85 and 86 and the central plate 84, the central plate is provided with an elongated wire 87 as may be seen more clearly in Fig. 4 on each side thereof and preferably secured in three or more places to hold it securely to the plate. If desired, the wire may be threaded through suitable openings in the plate to simplify its attachment.

The output coupling 81 of each screen is illustrated in Figs. 8 and 9 and includes a bifurcated member 88 extending downwardly over the sides of the outer channel member 82 and securely welded or otherwise fastened thereto in sealed relationship. The upper end of the bifurcated member 88 is generally tubular in section and has threaded end portion 89. This member also includes a flange or shoulder 90 which sets against the bottom surface of the manifold plate 71 when the filter is in place on the manifold. Attachment of the filter to the manifold is accomplished by a nut 91 and cooperating gasket 92. Communication between the opening 93 in the member 88 and the spaces 85' and 86' of the filter is accomplished by providing a gap 94 in the inner channel member 83 at a point centrally of the top edge of the filter as shown in Fig. 8. The opening required for the passage of the filtered liquid is quite small and thus the omission of a short section of channel member 83 will not weaken or otherwise adversely affect the strength of the filter.

In certain cases and particularly when back flushing is to be accomplished for the cleaning of the screens 85 and 86, a pressure may be built up in the spaces 85' and 86' that may deform or otherwise damage the screens. In order to avoid this situation, a relief valve generally denoted by the numeral 95 is disposed at the bottom of each screen 31 and is illustrated in Figs. 4, 10 and 11. This valve includes a bifurcated member 96 bridging and sealed to the outer channel member 82 at a point centrally of the lower edge of the screen 31 as shown in Fig. 4. This outer member 96 terminates in a tubular section 96' having a tapered mouth 97 acting as a valve seat. The inner channel member 83 is broken away to provide a gap 98 in the same manner as described in connection with the outlet 81 shown in Fig. 8 for affording communication between the spaces 85' and 86' and the mouth 96' of the bifurcated member.

A rod 99 extends through the mouth 96' of the bifurcated member 96 and is somewhat smaller in diameter than the internal diameter of the mouth 96'. The upper end 100 of the rod 99 is bifurcated or slotted to receive the central plate 84 of the filter assembly 31 and is welded or otherwise suitably secured to the plate. A tapered valve member 101 is slidably mounted on the rod 99 and is held firmly against the seat 97 by a pair of washers 102 and 103, an intervening spring 104 and a pair of lock nuts 105 and 106, the latter being threadably secured to the lower end of the rod 99. In order to protect the valve assembly, an outer cover 107 is threadably secured to and is carried by the valve member 101 to prevent dirt and sludge from interfering with the operation of the valve. With this arrangement as back pressure is applied to the spaces 85' and 86' between the central plate 84 and the screens 85 and 86, should this pressure exceed a pressure that would deform or damage the screens 85 and 86, the valve assembly 95 will open to permit fluid to be ejected directly into the surrounding chamber 10.

When the filter as described above is utilized with a closed system a pair of four-way valves 42 and 42' may be utilized to connect it to associated apparatus. The valve 42' includes an inlet 42", a connection 19 to the inlet manifold 18 and connections 108 to the valve 42. The valve 42 is coupled by means of a conduit 17 and valve 17' to the outlet 34 of the manifold 32 and the filtered liquid discharged through the conduit 109 of the valve 42. With this arrangement and with the valves set in one position, liquid to be filtered enters the vessel 10 through the conduit 42", valve 42', conduit 19 and the manifold 18 and will be discharged through the conduit 17, valve 17', valve 42 and the conduit 109. In order to reverse the liquid flow through the filter to dislodge sludge on the filter elements, valves 42 and 42' are operated to connect the inlet conduit to the outlet 17 of vessel 10 and the outlet conduit to the inlet manifold 18. In many cases, however, it may be preferred to close the valves 42 and 42' to interrupt the filtering operation and apply compressed air, super heated steam or other compressed fluid to the vent 111 and permit liquid in the vessel 10 to be discharged through the outlet 43.

The precedure for discharging sludge accumulating in the bottom section 11 of the vessel 10 was previously described and it was pointed out that the normal pressure applied to the inlet manifold 18 by external pumping apparatus would be sufficient to force the sludge downwardly into the receptacle 13 when the valve 15 is open. When the filter and manifold assembly is to be removed from the vessel 10, it is preferable to remove the sludge from the base 11 of the vessel 10 in the manner previously described. When this has been accomplished the valves 42 and 42' are moved into off positions and the vessel 10 is drained by opening the valve 43' and the outlet conduit 43 and opening the bleeder valve 110 on the conduit 111 communicating with the top side of the vessel 10. After the liquid has been removed the bottom closure member 11 is disconnected from the vessel 10 in the manner previously described and it, together with the receptacle 13, is removed from beneath the filter vessel 10. The entire filter assembly including the filters 31 and manifold 32 may then be lowered for cleaning, replacement and repair of the filters.

While only one embodiment of the invention has been illustrated and described, modifications, alterations and changes may be made without departing from the true scope and spirit thereof.

What is claimed is:

1. A fluid filter comprising a closed vessel having a recessed bottom closure member removably secured to the underside thereof, means supporting said vessel independently of the bottom closure therefor, filtering means supported within said vessel, means secured to said filtering means for lowering the latter out of said vessel upon removal of said removable bottom closure, a sealed sludge receptacle beneath said vessel and having removable access means, means including a valve coupling said receptacle to said bottom closure member to form a substantially unitary structure suspended from said vessel, fluid conduits coupled with said vessel for the admission of fluid to be filtered to said vessel and removal of the filtered fluid from said vessel and means for lowering said receptacle and bottom closure member as a unit to a supporting surface for displacement from beneath said vessel to permit removal of the filtering means therefrom.

2. A fluid filter according to claim 1 wherein said bottom closure includes screw-threaded means cooperating with the said vessel and bottom closure for lowering the bottom closure and receptacle away from said vessel to facilitate movement of the receptacle and bottom closure from beneath said vessel, said recessed closure member retaining sludge deposits produced by the filtering operation.

References Cited in the file of this patent

UNITED STATES PATENTS

| | | |
|---|---|---|
| 69,192 | Douglas | Sept. 24, 1867 |
| 617,029 | Koneman et al. | Jan. 3, 1899 |
| 709,616 | Thorne | Sept. 23, 1902 |
| 748,088 | Moore | Dec. 29, 1903 |
| 867,734 | Knock | Oct. 8, 1907 |
| 869,372 | Kelly | Oct. 29, 1907 |

(Other references on following page)

UNITED STATES PATENTS

| | | |
|---|---|---|
| 1,007,592 | Moore | Oct. 31, 1911 |
| 1,051,620 | Neil | Jan. 28, 1913 |
| 1,100,218 | Butters | June 16, 1914 |
| 1,100,267 | Stedman | June 16, 1914 |
| 1,102,747 | Hauer | July 7, 1914 |
| 1,226,104 | Merrill | May 15, 1917 |
| 1,302,814 | Kuryla | May 16, 1919 |
| 1,372,828 | Renn | Mar. 29, 1921 |
| 1,547,368 | Dehne | July 28, 1925 |
| 1,686,092 | Manning | Oct. 2, 1928 |
| 2,013,776 | Wiesman | Sept. 10, 1935 |
| 2,016,163 | Wildermen | Oct. 1, 1935 |
| 2,081,009 | Kelley | May 18, 1937 |
| 2,255,145 | Baker | Sept. 9, 1941 |
| 2,278,148 | Monsarrat | Mar. 31, 1942 |
| 2,300,789 | Kelley | Nov. 3, 1943 |
| 2,354,623 | Tietig | July 25, 1944 |
| 2,366,903 | Harms | Jan. 9, 1945 |
| 2,443,087 | Ulrich | June 8, 1948 |
| 2,480,320 | Carrier | Aug. 30, 1949 |
| 2,487,769 | Ebert et al. | Nov. 8, 1949 |
| 2,491,180 | Horthy | Dec. 13, 1949 |
| 2,601,156 | Lax | June 17, 1952 |
| 2,656,930 | DeVries | Oct. 27, 1953 |
| 2,691,445 | Eickemeyer | Oct. 12, 1954 |
| 2,778,503 | White | Jan. 22, 1957 |
| 2,788,126 | Gardes et al. | Apr. 9, 1957 |

FOREIGN PATENTS

| | | |
|---|---|---|
| 287,857 | Switzerland | Dec. 31, 1952 |